United States Patent [19]
Compton et al.

[11] 3,803,481
[45] Apr. 9, 1974

[54] LEAK DETECTOR

[75] Inventors: Robert N. Compton; John A. D. Stockdale, both of Oak Ridge, Tenn.

[73] Assignee: The United States of America as represented by the United States Atomic Energy Commission, Washington, D.C.

[22] Filed: Mar. 20, 1973

[21] Appl. No.: 343,072

[52] U.S. Cl. .................................... 324/33, 73/23
[51] Int. Cl. ..................... G01n 27/00, G01n 27/62
[58] Field of Search ....... 324/33; 73/23, 27 A, 40.7, 73/194 F

[56] References Cited
UNITED STATES PATENTS

| | | | |
|---|---|---|---|
| 2,815,659 | 12/1957 | Krupp | 73/27 A |
| 3,504,273 | 3/1970 | Eller et al. | 73/23 |
| 3,504,274 | 3/1970 | Eller et al. | 73/27 A |
| 3,045,474 | 7/1962 | Ebbinghaus | 73/27 A |
| 2,763,151 | 9/1956 | Richardson | 73/27 A |
| 2,603,964 | 7/1952 | Foley et al. | 73/27 A |
| 3,504,275 | 3/1970 | Eller et al. | 73/23 X |

*Primary Examiner*—Stanley T. Krawczewicz
*Attorney, Agent, or Firm*—John A. Horan; David S. Zachry; L. M. Deckelmann

[57] ABSTRACT

A vacuum leak detector is provided which utilizes a search gas which has a high electron attachment cross section. Within a vacuum system, negative ions are formed from inleaking gas by providing sufficient low energy, magnetically confined electrons, and the current of such negative ions is utilized to determine the degree of inleakage of an electron attaching gas.

8 Claims, 1 Drawing Figure

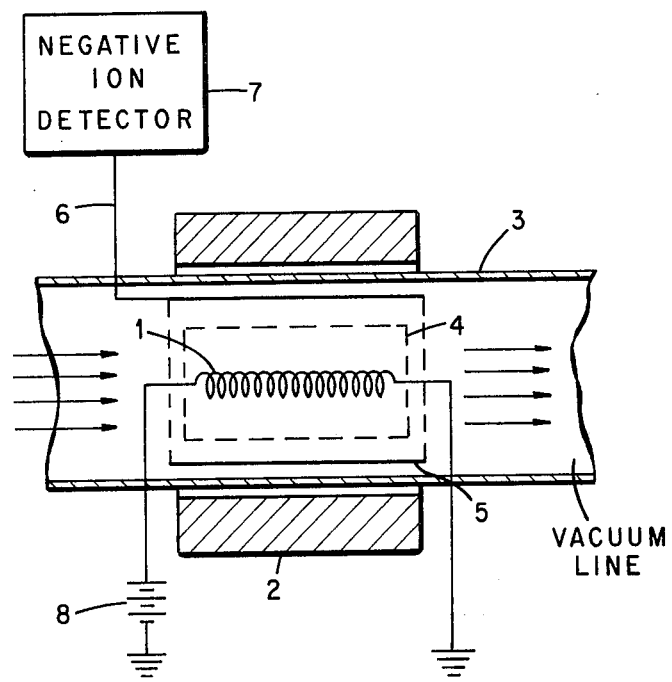

LEAK DETECTOR

BACKGROUND OF THE INVENTION

This invention was made in the course of, or under, a contract with the United States Atomic Energy Commission.

The conventional vacuum leak detector employs a mass spectrometer to ionize and mass-select positive helium ions which are produced from helium gas diffusing through a small leak in a vacuum chamber. Partly because of the need for mass analysis (to differentiate against positive ions from residual air in the leak detector itself), the equipment is bulky, often cumbersome to operate, and expensive. The present invention was conceived to detect leaks in a more efficient and direct manner with a minimum of equipment in a way to be described hereinafter.

SUMMARY OF THE INVENTION

It is the object of the present invention to provide an improved method and apparatus for leak detection in vacuum which is simple while at the same time is more accurate and sensitive.

The above object has been accomplished in the present invention by generating low energy electrons within a vacuum enclosure and within a magnetic field, forming negative ions from inleaking gas by electron attachment, and collecting such negative ions to provide an indication of the degree of inleakage.

BRIEF DESCRIPTION OF THE DRAWING

The single FIGURE is a sectional view of the leak detection apparatus utilized in the present invention to accomplish the above objective.

DESCRIPTION OF THE PREFERRED EMBODIMENT

The vacuum leak detector of the present invention is illustrated in the single figure in the drawing. As shown, a filament 1 is connected to ground and to a power supply such as a battery 8, such that low-energy (thermal) electrons are produced by thermionic emission from the hot filament 1. These electrons are confined to spiral paths close to the filament by an axial magnetic field of 100 to 500 gauss produced by a permanent magnet 2 encompassing the hot filament 1. The magnet 2 may be located outside the vacuum enclosure 3, as shown, or it may be located inside of the enclosure, if desired. Negative ions formed by electron attachment to a selected leak gas on or near the filament will traverse spirals of much greater radius (since their masses are approximately $10^5$ times the electron mass), and on passing through a grid 4 are collected on an anode 5. The anode 5 is connected to a suitable detector 7 by a line 6, such that the current of such negative ions as sensed by the detector 7 will provide an indication of the degree of inleakage into the vacuum enclosure.

Molecules having a high electron attachment cross section, such as $SF_6$, $CCL_4$, $C_4F_8$, $C_6F_{10}$, $C_6F_6$, $C_7F_{14}$, and many of the freon gases, for example, would be applied in localized areas over a surface to be leak tested. This increases the accuracy of pin-pointing the location of leaks. The electron attachment probabilities for a number of substances (e.g., $SF_6$, $C_7F_{14}$) are 1000 to 10,000 times the peak probabilities for formation of helium positive ions by single electron impact. Thus, in the present invention, there exists the possibility of greater sensitivity allowing one to detect smaller leaks. Furthermore, the above-mentioned substances are much cheaper than helium and could be used in small readily portable cylinders which would probably have equal use-life to a large bulky cylinder of helium. Many of the above-mentioned test molecules are liquids (e.g., $CCL_4$, $C_6F_6$, etc.) and could be applied directly to the surface to allow for greater accuracy in locating a leak. The helium leak detector suffers from the difficulty that once sprayed at one point the helium diffuses through the air to the point of the leak giving a false reading.

It can be seen that the leak detector of the present invention is a simple tube which is not expensive to manufacture and can normally be permanently attached to the user's vacuum system just as ion gauges are presently used.

Thus, a method for vacuum leak detection is provided by the present invention, wherein low-energy electrons generated within a vacuum line are encompassed by a magnetic field, negative ions are formed from inleaking gas by electron attachment, and such negative ions are collected to provide an indication of the degree of inleakage into the vacuum line.

This invention has been described by way of illustration rather than by limitation and it should be apparent that it is equally applicable in fields other than those described.

What is claimed is:

1. A method for detecting leaks in a vacuum enclosure comprising the steps of generating low energy electrons from a hot filament within and along the axis of a tubular portion of the enclosure, confining said electrons along said axis with a magnetic field encompassing said tubular portion; applying a high elecron attachment cross section fluid over an exterior surface of said vacuum enclosure to be leak tested, said fluid selected from the group consisting essentially of $SF_6$, $CCL_4$, $C_4F_8$, $C_6F_{10}$, $C_6F_6$, and $C_7F_{14}$; forming negative ions from inleaking gas from said selected fluid by electron attachment; collecting said negative ions by a tubular anode encompassing said electron generating filament within said enclosure tubular portion; and measuring the collected ion current to provide an indication of the degree of inleakage of said fluid into said vacuum enclosure.

2. The method set forth in claim 1, wherein said selected fluid is $SF_6$.

3. The method set forth in claim 1, wherein said selected fluid is $CCL_4$.

4. The method set forth in claim 1, wherein said selected fluid is $C_4F_8$.

5. The method set forth in claim 1, wherein said selected fluid is $C_6F_{10}$.

6. The method set forth in claim 1, wherein said selected fluid is $C_6F_6$.

7. The method set forth in claim 1, wherein said selected fluid is $C_7F_{14}$.

8. The method set forth in claim 1, wherein said magnetic field provides a confining field of a selected amount in the range from 100 to 500 gauss for confining said low energy electrons in the central portion of said enclosure.

* * * * *